United States Patent Office 3,196,172
Patented July 20, 1965

3,196,172
**TRIFLUOROMETHYLPHENYLALKYLENE-
DIAMINES**
William Blythe Wright, Jr., Woodcliff Lake, N.J., and
Herbert Joseph Brabander, Pearl River, N.Y., assignors
to American Cyanamid Company, Stamford, Conn., a
corporation of Maine
No Drawing. Filed May 20, 1963, Ser. No. 281,803
3 Claims. (Cl. 260—471)

This invention relates to new organic compounds and more particularly is concerned with novel trifluoromethylphenylalkylenediamines and methods of preparing the same.

The new compounds of this invention may be represented by the following general formula:

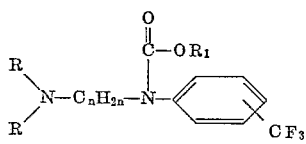

wherein R is hydrogen, lower alkyl, lower aralkyl, lower alkenyl, propargyl or cycloalkyl,

when joined together are piperidino, lower alkylpiperidino, morpholino, lower alkylmorpholino, pyrrolidino, lower alkylpyrrolidino, hexamethyleneimino, piperazinyl, lower alkylpiperazinyl or phenylpiperazinyl radicals, $R_1$ is lower alkyl, lower alkenyl or cycloalkyl, and $n$ is an integer from 2 to 3; and the non-toxic acid addition salts thereof.

In a more preferred embodiment, the present invention contemplates novel compounds which may be illustrated by the following general formula:

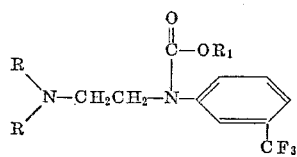

wherein R is lower alkyl and

when joined together are piperidino, lower alkylpiperidino, morpholino, lower alkylmorpholino, pyrrolidino, lower alkylpyrrolidino, hexamethyleneimino, piperazinyl or lower alkylpiperazinyl, $R_1$ is lower alkyl, and the non-toxic therapeutically useful acid addition salts thereof.

In a still more preferred embodiment, the present invention is directed to novel compounds illustrated by the following general formula:

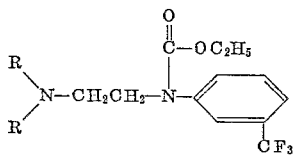

wherein R is lower alkyl and non-toxic acid addition salts thereof.

Suitable lower alkyl radicals contemplated by the present invention are those having from 1 to 4 carbon atoms. Suitable lower alkenyl substituents are allyl, methallyl, 2-butenyl, etc. Suitable aralkyl radicals are benzyl, phenethyl, phenylpropyl, phenylbutyl, etc. Suitable cycloalkyl substituents are, for example, cyclopropyl, cyclopentyl and cyclohexyl.

The new compounds of this invention are highly active central nervous system anti-depressants at non-toxic doses. The present invention contemplates that these compounds will be useful as therapeutic agents in the treatment of endogenous depression. The anti-depressant action of the new compounds of this invention may be demonstrated in a number of ways. For example, the procedure described below has been found to be useful in showing an anti-depressant effect in counteracting depression. It is especially desirable that an effective anti-depressant agent should exert its action on a depressed individual, but show little or no action on a normal individual. This testing procedure is designed to demonstrate this type of activity.

The anti-depressant properties of the compounds of the present invention are observed by measuring their ability to counteract, in animals, a depression induced by the administration of tetrabenazine hexamate, a well known agent capable of producing a profound depression. Graded doses of the new compounds are administered intraperitoneally to groups of mice. One hour later, tetrabenazine hexamate is administered at a dose which is known to depress exploratory behavior in groups of normal mice. Thirty minutes later the anti-depressant treated groups are placed individually at the center of a horizontal disc about 18 inches in diameter. Within a short period of time these individual mice show normal exploratory behavior such as walking to the edge and looking over the side or other characteristic movements related to the normal tendency to explore a new environment. Individual mice, treated with tetrabenazine hexamate alone or in a combination with an ineffective anti-depressant agent, do not show this normal exploratory behavior, but remain at the center of the disc for a considerable period of time.

The compounds of this invention exhibit this desirable anti-depressant property when tested by this procedure at dose levels which produce little or no untoward reactions such as ataxia or reduced spontaneous motor activity. These doses are also well below the lethal levels, thereby demonstrating a satisfactory therapeutic index of safety. These compounds compare favorably with effective anti-depressant drugs such as imipramine and amitryptyline when tested by the procedures described above.

The active trifluoromethyl carbanilates of this invention may be used as a free base or as a non-toxic acid addition salt, which may be readily prepared by treating the free base with an acid such as hydrochloric, sulfuric, phosphoric, citric, tartaric, maleic, fumaric, etc. at a pH of between about 1 and 7. The compounds may be administered orally or parenterally if desired, and when so administered are active anti-depressant agents for therapeutically desirable treatment of depression at individual doses ranging from about 10 to about 200 milligrams. The dosage regimen can be adjusted to provide optimum therapeutic response. Thus, for example, several doses may be administered daily, or the dose may be reduced proportionately as indicated by the exigencies of the therapeutic situation.

For therapeutic administration, the active trifluoromethyl carbanilates of this invention may be incorporated with excipients and used, for example, in the form of tablets, dragees, capsules, suppositories, liquids, elixirs, emulsions, suspensions, syrups, chocolate, candy, wafers, chewing gum or the like. Such compositions and preparations should contain at least 0.1% of active compound. The percentage in the compositions and preparations may, of course, be varied, and may conveniently be between about 2% and 60% or more of the weight of the unit. The amount of active compound in such therapeutically useful compositions or preparations is such that a suitable dosage will be obtained. Preferred compositions or preparations according to the present invention are prepared so that a dosage unit form contains between about 10 and about 200 milligrams of an active trifluoromethyl carbanilate.

Tablets, pills, dragees and the like may contain the following: a binder such as gum tragacanth, acacia, corn starch or gelatin; a disintegrating agent such as corn starch, potato starch, alginic acid or the like; a lubricant such as stearic acid, magnesium stearate, talc or the like; and a sweetening agent such as sucrose or saccharin may be added, as well as a flavoring agent such as peppermint, oil of wintergreen or cherry flavoring.

A syrup or elixir may contain the active trifluoromethyl carbanilates in the form of its citrate, for example, and sucrose as a sweetening agent, methyl and propyl parabens as preservatives, a dye and a flavoring such as cherry or orange flavoring.

In the form if its pamoic acid, alginic acid, tannic acid, or other insoluble salt, the trifluoromethyl carbanilates can be made up into one of the various sustained release forms well known to the pharmaceutical art.

The new compounds may be prepared by several different routes which also form a part of the present invention.

Many of the compounds of this invention are preferably prepared by acylation of appropriate ethylenediamines with lower alkyl haloformate according to the following general reaction scheme:

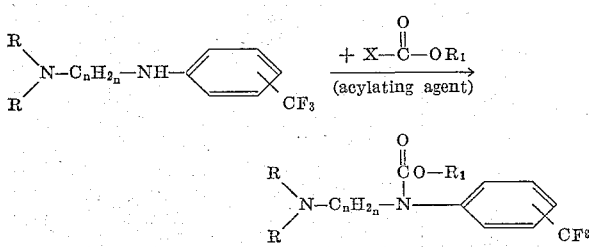

wherein $R_1$ and $n$ are as hereinbefore defined and R is selected from the group consisting of lower alkyl, lower aralkyl, lower alkenyl, propargyl and cycloalkyl,

when joined together are members of the group consisting of piperidino, lower alkylpiperidino, morpholino, lower alkylmorpholino, pyrrolidino, lower alkylpyrrolidino, hexamethyleneimino, lower alkylpiperazinyl and phenylpiperazinyl and X is reactive halogen. This reaction may be carried out in an inert solvent such as benzene, toluene, chloroform, ethyl methyl ketone, ethyl acetate, dimethylformamide and the like at a temperature range of about 0°–150° C. and over a period of time ranging from less than an hour to more than 8 hours. Ordinarily, however, the temperature range is from room temperature to reflux temperature and the time of reaction is from 1 to 6 hours. Another useful acylating agent which may be employed in place of the lower alkyl haloformate, is a di-lower alkyl carbonate such as diethyl carbonate. Alternately, this acylation process may be carried out by treatment of the appropriate ethylenediamines with phosgene followed by an alkanol such as ethanol. The ethylenediamine intermediates are readily obtained by standard procedures known to the art.

In addition, the compounds of this invention in which one R is hydrogen and the other R is lower alkyl or lower aralkyl may be prepared by catalytic reduction of an appropriate N-benzyl-substituted starting material as illustrated schematically below.

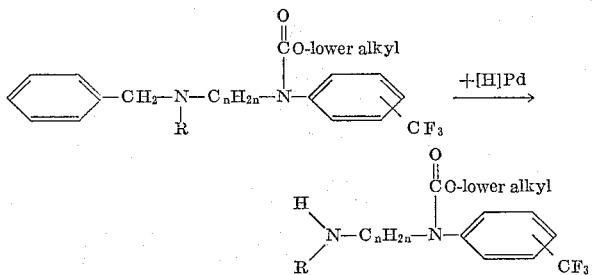

wherein R and n are as defined above.

A third method of preparing the compounds of this invention is to react an appropriately substituted ethylenediamine having hydrogen and lower alkyl substituents on the basic nitrogen atom with a halogenated lower alkyl, alkenyl, propargyl or aralkyl compound in the presence of a suitable acid acceptor according to the following equation:

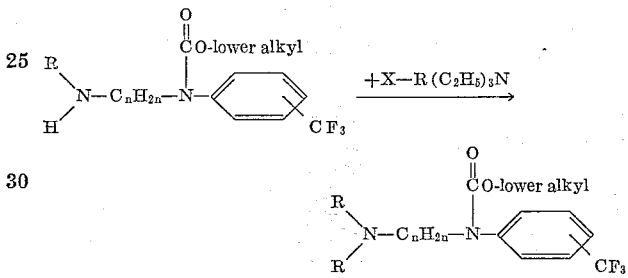

wherein R and n are as defined above, and X is reactive halogen or arylsulfonyloxy radical. Alternately, this alkylation procedure may be carried out by a reductive technique with an appropriate aldehyde such as benzaldehyde, phenylacetaldehyde and the like.

The compounds of this invention may also be generally prepared by the alkylation of a suitably substituted carbanilate as illustrated below:

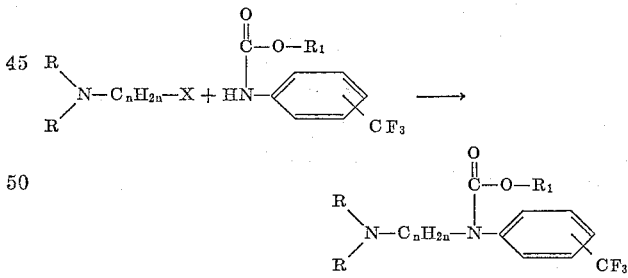

wherein R, $R_1$ and $n$ are as defined hereinabove and X is reactive halogen or an arylsulfonyloxy radical.

This reaction is facilitated by such agents as sodium, sodium hydride, and the like. It is usually carried out in a solvent such as benzene, toluene, tetrahydrofuran, diglyme, and the like. The preferred temperature range is from about 20° C. to about 150° C.

Still another method for preparing the compounds of this invention is illustrated by the following reaction scheme:

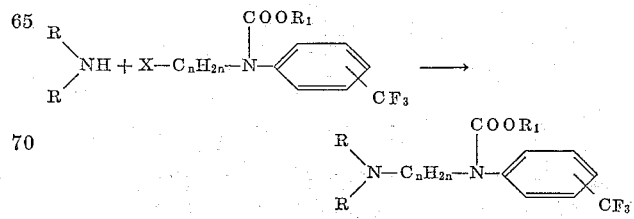

wherein R, $R_1$ and $n$ are as defined hereinabove and X is reactive halogen or an arylsulfonyloxy radical.

The invention will be described in greater detail in conjunction with the following specific examples in which the parts are by weight unless otherwise specified.

EXAMPLE I

*Preparation of ethyl N-(2-dimethylaminoethyl)-m-trifluoromethylcarbanilate hydrochloride*

A solution of 11.6 parts of N-(m-trifluoromethylphenyl)-N',N'-dimethylethylenediamine in 100 parts of benzene is heated with 7.6 parts of ethyl chloroformate for two hours. The reaction mixture is cooled and the precipitate is filtered off. The ethyl N-(2-dimethylaminoethyl)-m-trifluoromethylcarbanilate hydrochloride is purified by recrystallization from ethanol and ether, melting point 191–192° C.

The above product is easily converted to the free base by mixing with ether and an excess of dilute alkali, separating the two layers and concentrating the ether layer to recover the desired product.

EXAMPLE II

*Preparation of ethyl N-(2-dimethylaminoethyl)-m-trifluoromethylcarbanilate hydrochloride*

A solution of 7 parts of ethyl m-trifluoromethylcarbanilate, boiling point 100–105° C./0.1 mm., in 25 parts of diglyme is added to a mixture of 1.6 parts of 50% sodium hydride in mineral oil in 50 parts of diglyme. The reaction mixture is stirred for one hour and a solution of 4 parts of dimethylaminoethyl chloride in 150 parts of ether is added. The mixture is stirred for one hour and then heated to remove the ether. The reaction mixture in diglyme is heated at reflux temperature for 3 hours and filtered to remove insoluble material. The mother liquor is concentrated to a syrup. The residue is dissolved in ether and the ether layer is washed with water. The desired product is extracted into 1 N hydrochloric acid. The acid layer is made basic with 1 N sodium hydroxide solution and extracted with ether. The ether layer is diluted with alcoholic HCl and the precipitated ethyl N-(2-dimethylaminoethyl)-m-trifluoromethylcarbanilate hydrochloride is filtered off.

EXAMPLE III

*Preparation of ethyl N-(2-dimethylaminoethyl)-p-trifluoromethylcarbanilate*

The above compound is obtained when N-(p-trifluoromethylphenyl)-N',N'-dimethylethylenediamine is reacted with ethyl chloroformate in the procedure of Example I.

EXAMPLE IV

*Preparation of ethyl N-(2-dimethylaminoethyl)-o-trifluoromethylcarbanilate*

The above compound is obtained when N-(o-trifluoromethylphenyl)-N',N'-dimethylethylenediamine is reacted with ethyl chloroformate in the procedure of Example I.

EXAMPLE V

*Preparation of propyl N-(2-dimethylaminoethyl)-m-trifluoromethylcarbanilate*

The above product, melting point 139–141° C., is obtained when propyl chloroformate is substituted for ethyl chloroformate in the procedure of Example I.

EXAMPLE VI

*Preparation of allyl N-(2-dimethylaminoethyl)-m-trifluoromethylcarbanilate*

The above product is obtained when allyl chloroformate is substituted for ethyl chloroformate in the procedure of Example I.

EXAMPLE VII

*Preparation of methallyl N-(2-dimethylaminoethyl)-m-trifluoromethylcarbanilate*

The above product is obtained when methallyl chloroformate is substituted for ethyl chloroformate in the procedure of Example I.

EXAMPLE VIII

*Preparation of methyl N-(2-dimethylaminoethyl)-m-trifluoromethylcarbanilate hydrochloride*

The above product, melting point 189–190° C., is obtained when methyl chloroformate is substituted for ethyl chloroformate in the procedure of Example I.

EXAMPLE IX

*Preparation of cyclohexyl N-(2-dimethylaminoethyl)-m-trifluoromethylcarbanilate*

The above product is obtained when cyclohexyl chloroformate is substituted for ethyl chloroformate in the procedure of Example I.

EXAMPLE X

*Preparation of cyclopentyl N-(2-dimethylaminoethyl)-m-trifluoromethylcarbanilate*

The above product is obtained when cyclopentyl chloroformate is substituted for ethyl chloroformate in the procedure of Example I.

EXAMPLE XI

*Preparation of ethyl N-(3-dimethylaminopropyl)-m-trifluoromethylcarbanilate hydrochloride*

The above compound, melting point 156–157° C., is obtained when ethyl chloroformate is reacted with N-(m-trifluoromethylphenyl-N',N' - dimethyl - 1,3 - propanediamine by the procedure of Example I.

EXAMPLE XII

*Preparation of ethyl N-(2-dimethylaminopropyl)-m-trifluoromethylcarbanilate*

The above compound is obtained when ethyl chloroformate is reacted with N'-m-trifluoromethylphenyl)-$N^2,N^2$ dimethyl-1,2,-propanediamine by the procedure of Example I.

EXAMPLE XIII

*Preparation of ethyl N-(1-methyl-2-dimethylaminoethyl)-m-trifluoromethylcarbanilate hydrochloride*

The above compound, melting point 132–133° C., is obtained when ethyl chloroformate is reacted with $N^2$-(m-trifluoromethylpheny)-N',N'-dimethyl-1,2 - propanediamine by the procedure of Example I.

EXAMPLE XIV

*Preparation of ethyl N-(2-piperidinoethyl)-m-trifluoromethylcarbanilate hydrochloride*

The above compound, melting point 133–135° C., is obtained when ethyl chloroformate is reacted with N-(2-piperidinoethyl)-m-trifluoromethyl aniline by the procedure of Example I.

EXAMPLE XV

*Preparation of ethyl-N-[2(2-methylpiperidino)-ethyl]-m-trifluoromethylcarbanilate*

The above compound is obtained when ethyl chloroformate is reacted with N-[2-(2-methylpiperidino)ethyl]-m-trifluoromethylaniline by the procedure of Example I.

EXAMPLE XVI

*Preparation of ethyl N-(2-pyrrolidinoethyl)-m-trifluoromethylcarbanilate hydrochloride*

The above compound, melting point 134–136° C., is obtained when ethyl chloroformate is reacted with N-(2-pyrrolidinoethyl)-m-trifluoromethylaniline by the procedure of Example I.

EXAMPLE XVII

*Preparation of ethyl N-[2-(2-methylpyrrolidino)-ethyl]-m-trifluoromethylcarbanilate*

The above compound is obtained when ethyl chloroformate is reacted with N-[2-(2-methylpyrrolidino)ethyl]-m-trifluoromethylaniline by the procedure of Example I.

EXAMPLE XVIII

*Preparation of ethyl N-(2-hexamethyleneiminoethyl)-m-trifluoromethylcarbanilate*

The above compound is obtained when ethyl chloroformate is reacted with N-(2-hexamethyleneiminoethyl)-m-trifluoromethylaniline by the procedure of Example I.

EXAMPLE XIX

*Preparation of ethyl N-(2-morpholinoethyl)-m-trifluoromethylcarbanilate*

The above compound is obtained when ethyl chloroformate is reacted with N-(2-morpholinoethyl)-m-trifluoromethylaniline by the procedure of Example I.

EXAMPLE XX

*Preparation of ethyl N-[2-(2,6-dimethylmorpholino)-ethyl]-m-trifluoromethylcarbanilate*

The above compound is obtained when ethyl chloroformate is reacted with N-[2-(2,6-dimethylmorpholino)-ethyl-m-trifluoromethylaniline by the procedure of Example I.

EXAMPLE XXI

*Preparation of ethyl N-[3-(4-methylpiperazinyl)-propyl]-m-trifluoromethylcarbanilate*

The above compound is obtained when ethyl m-trifluoromethylcarbanilate is reacted with 3-(4-methylpiperazinyl)propyl chloride by the procedure of Example II.

EXAMPLE XXII

*Preparation of ethyl N-[3-(4-ethylpiperazinyl)-propyl]-m-trifluoromethylcarbanilate*

The above compound is obtained when ethyl m-trifluoromethylcarbanilate is reacted with 3-(4-ethylpiperazinyl)propyl chloride by the procedure of Example II.

EXAMPLE XXIII

*Preparation of ethyl N-[3-(4-phenylpiperazinyl)-propyl]-m-trifluoromethylcarbanilate*

The above compound is obtained when ethyl m-trifluoromethylcarbanilate is reacted with 3-(4-phenylpiperazinyl)propyl chloride by the procedure of Example II.

EXAMPLE XXIV

*Preparation of ethyl N-(2-benzylmethylaminoethyl)-m-trifluoromethycarbanilate hydrochloride*

The above compound, melting point 133–135° C., is obtained when ethyl chloroformate is reacted with N-benzyl-N-methyl-N'-(m-trifluoromethylphenyl)-ethylenediamine by the procedure of Example I.

EXAMPLE XXV

*Preparation of ethyl N-(2-methylphenethylaminoethyl)-m-trifluoromethylcarbanilate*

The above compound is obtained when ethyl chloroformate is reacted with N-methyl-N-phenethyl-N'-m-(trifluoromethylphenyl)ethylenediamine by the procedure of Example I.

EXAMPLE XXVI

*Preparation of ethyl N-(2-methylaminoethyl)-m-trifluoromethylcarbanilate hydrochloride*

A mixture of 8.3 parts of ethyl N-(2-benzylmethylaminoethyl)-m-trifluoromethylcarbanilate hydrochloride, 100 parts of 90% ethanol and 1 part of 10% palladium-on-carbon catalyst is shaken in a Parr hydrogenator under a hydrogen atmosphere until the theoretical amount of hydrogen is absorbed. The catalyst is filtered off and the solvent is distilled off in order to recover the desired product, melting point 136–137° C.

EXAMPLE XXVII

*Preparation of ethyl N-(2-allylmethylaminoethyl)-m-trifluoromethylcarbanilate*

The above compound is obtained when ethyl chloroformate is reacted with N-allyl-N'-(m-trifluoromethylphenyl)-N-methylethylenediamine by the procedure of Example I.

EXAMPLE XXVIII

*Preparation of ethyl N-(2-methallylmethylaminoethyl)-m-trifluoromethylcarbanilate*

The above compound is obtained when ethyl chloroformate is reacted with N-methallyl-N'-trifluoromethylphenyl)-N-methylethylenediamine by the procedure of Example I.

EXAMPLE XXIX

*Preparation of ethyl N-(2-propargylmethylaminoethyl)-m-trifluoromethylcarbanilate*

The above compound is obtained when ethyl chloroformate is reacted with N-(m-trifluoromethylphenyl)-N'-methyl-N'-propargylethylenediamine by the procedure of Example I.

EXAMPLE XXX

*Preparation of ethyl N-(2-cyclohexylmethylaminoethyl)-m-trifluoromethylcarbanilate*

The above compound is obtained when ethyl chloroformate is reacted with N-cyclohexyl-N'-(m-trifluoromethylphenyl)-N-methylethylenediamine by the procedure of Example I.

EXAMPLE XXXI

*Preparation of ethyl N-(2-cyclopropylmethylethylaminoethyl)-m-trifluoromethylcarbanilate*

The above compound is obtained when ethyl chloroformate is reacted with N-cyclopropylmethy-N-ethyl-N'-(m-trifluoromethylphenyl)-N-methylethylenediamine by by the procedure of Example I.

EXAMPLE XXXII

*Preparation of ethyl N-(2-ethylmethylaminoethyl)-m-trifluoromethylcarbanilate hydrochloride*

The above compound, melting point 145–146° C., is obtained when ethyl-m-trifluoromethylcarbanilate is reacted with ethylmethylaminoethyl chloride by the procedure of Example II.

EXAMPLE XXXIII

*Preparation of ethyl N-(2-diethylaminoethyl)-m-trifluoromethylcarbanilate hydrochloride*

The above compound is obtained when ethyl m-trifluoromethylcarbanilate is reacted with diethylaminoethyl chloride by the procedure of Example II.

EXAMPLE XXIV

*Preparation of pharmaceutical tablets containing ethyl N-(2-dimethylaminoethyl)-m-trifluoromethycarbanilate hydrochloride*

Ethyl N-(2-dimethylaminoethyl)-m-trifluoromethylcarbanilate hydrochloride is incorporated into a standard pharmaceutical tablet according to the following formulation:

|  | Per Tablet (Gram) | For 10,000 Tablets (Grams) |
|---|---|---|
| Ethyl N-(2-dimethylaminoethyl)-m-trifluoromethylcarbanilate hydrochloride | 0.020 | 200 |
| Lactose | 0.140 | 1,400 |
| Corn Starch (for mix) | 0.010 | 100 |
| Corn Starch (for paste) | 0.0075 | 75 |
|  | 0.1775 | 1,775 |
| Magnesium Stearate (1%) | 0.0020 | 20 |
|  | 0.1795 | 1,795 |

The active ingredient, lactose and corn starch (for mix) are blended together. The corn starch (for paste) is suspended in 600 milliters of water and heated with stirring to form a paste. This paste is then used to granulate the mixed powders. Additional water is used, if necessary. The wet granules are passed through a No. 8 hand screen and dried at 120° F. The dry granules are then passed through a No. 16 screen. The mixture is lubricated with 1% magnesium stearate and compressed into tablets in a suitable tabletting machine.

We claim:
1. A compound selected from the group consisting of a compound of the formula:

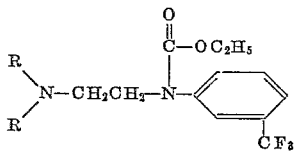

wherein R is lower alkyl and non-toxic therapeutically useful acid addition salts thereof.

2. Ethyl N - (2 - dimethylaminoethyl) - m- trifluoromethylcarbanilate.

3. Ethyl - N - (2 - benzylmethylaminoethyl) - m - trifluoromethylcarbanilate hydrochloride.

References Cited by the Examiner

UNITED STATES PATENTS

| 2,662,092 | 12/53 | Cusic | 260—471 |
| 2,833,764 | 5/58 | Barker | 260—247.2 |
| 2,997,422 | 8/61 | Tedeschi | 167—65 |
| 3,088,871 | 5/63 | Pfeiffer | 167—65 |
| 3,088,947 | 5/63 | Giraldi | 260—247.2 |
| 3,097,229 | 7/63 | Beaver | 260—471 |
| 3,117,128 | 1/64 | Mooradian | 260—294.3 |

OTHER REFERENCES

Hayashi et al.: "Pharm. Society of Japan J." vol. 83, pp. 62–73 (January 1963).

Shigematsu: "Pharm. Society of Japan J." vol. 81, pp. 423–426 (1961).

Wright et al.: I, "J. Org. Chem." vol. 26, pp. 476–484, (1961).

Wright et al.: II, "J. Org. Chem." vol. 26, pp. 4051–4057 (1961).

Yale: "J. of Medicinal and Pharmaceutical chemistry," vol. 1, No. 2, pages 121–131 (1959).

NICHOLAS S. RIZZO, *Primary Examiner.*

FRANK CACCIAPAGLIA, JR., *Examiner.*